(12) United States Patent
Look

(10) Patent No.: US 6,758,405 B2
(45) Date of Patent: Jul. 6, 2004

(54) ARTICLE WITH RETROREFLECTIVE AND RADIO FREQUENCY-RESPONSIVE FEATURES

(75) Inventor: Thomas F. Look, Ham Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 39 days.

(21) Appl. No.: 10/027,764

(22) Filed: Dec. 19, 2001

(65) Prior Publication Data

US 2003/0111542 A1 Jun. 19, 2003

(51) Int. Cl.[7] .............................................. G06K 19/06

(52) U.S. Cl. ...................................................... 235/494

(58) Field of Search ................................ 235/492–494, 235/488, 380, 384, 435, 449, 454; 340/572, 933; 283/81–82, 93; 359/529–530, 526, 533, 536

(56) References Cited

U.S. PATENT DOCUMENTS

| | | | |
|---|---|---|---|
| 3,752,960 A | 8/1973 | Walton | 235/61.11 |
| 3,816,708 A | 6/1974 | Walton | 235/61.11 |
| 4,001,822 A | 1/1977 | Sterzer | 343/6.5 |
| 4,223,830 A | 9/1980 | Walton | 235/380 |
| 4,578,654 A | 3/1986 | Tait | 333/175 |
| 4,580,041 A | 4/1986 | Walton | 235/380 |
| 4,583,083 A | 4/1986 | Bogasky | 340/572 |
| 4,598,276 A | 7/1986 | Tait | 340/572 |
| 4,660,025 A | 4/1987 | Humphrey | 340/572 |
| 4,837,568 A | 6/1989 | Snaper | 340/825 |
| 4,857,893 A | 8/1989 | Carroll | 340/572 |
| 4,940,966 A | 7/1990 | Pettigrew et al. | 340/551 |
| 4,964,053 A | 10/1990 | Humble | 364/466 |
| 5,019,815 A | 5/1991 | Lemelson et al. | 340/933 |
| 5,030,807 A | 7/1991 | Landt et al. | |
| 5,059,951 A | 10/1991 | Kaltner | 340/572 |
| 5,119,070 A | 6/1992 | Matsumoto et al. | 340/572 |
| 5,151,684 A | 9/1992 | Johnsen | 340/572 |
| 5,432,864 A | 7/1995 | Lu et al. | 382/118 |

(List continued on next page.)

FOREIGN PATENT DOCUMENTS

| | | | |
|---|---|---|---|
| EP | 0 892 399 | 1/1999 | |
| EP | 1 120 739 A2 | 8/2001 | |
| WO | WO 98/27670 | 6/1998 | H04B/7/08 |
| WO | WO 99/45513 | 9/1999 | |
| WO | WO 01/57807 A1 | 8/2001 | G07C/9/00 |

OTHER PUBLICATIONS

Product Bulletin 3750E/3770E entitled 3M Scotchlite™ Reflective License Plate Sheeting, Series 3750E/3770E with Ensure™ Image for Use on Multi–Year License Plates; Jan. 1997 (5 pgs.).

*Primary Examiner*—Thien M. Le
*Assistant Examiner*—Edwyn Labaze
(74) *Attorney, Agent, or Firm*—Melissa E. Buss

(57) ABSTRACT

The present disclosure includes a system that provides visual and electronic information in a readily identifiable combination tag where the radio frequency-responsive element is in close proximity to the retroreflective element. The combination tag includes a retroreflective article with an optical article and a reflective layer. The optical article has an optical surface and structured surface. For example the optical article can include as optical elements glass microspheres (optical beads) or cube corner reflectors. The reflective layer is deposited on at least a portion of the structured surface of the optical article. For example, the reflective layer can include a non-contiguous metal layer. The combination tag also includes a radio frequency-responsive element. The radio frequency-responsive element includes an antenna and an integrated circuit. The radio frequency-responsive element has information storage and transmission capabilities adapted to enable an interrogation system to obtain information from the radio frequency-responsive element. The radio frequency-responsive element is coupled to one of the optical surface or the rear surface of the optical article.

11 Claims, 3 Drawing Sheets

U.S. PATENT DOCUMENTS

| | | | |
|---|---|---|---|
| 5,444,223 A | | 8/1995 | Blama ........................ 235/435 |
| 5,490,079 A | | 2/1996 | Sharpe et al. ............... 364/467 |
| 5,497,140 A | | 3/1996 | Tuttle ........................... 342/51 |
| 5,608,391 A | * | 3/1997 | Bantli et al. ................ 340/933 |
| 5,621,571 A | * | 4/1997 | Bantli et al. ................ 359/529 |
| 5,635,693 A | | 6/1997 | Benson et al. .............. 235/384 |
| 5,656,360 A | | 8/1997 | Faykish et al. ............. 428/195 |
| 5,657,008 A | | 8/1997 | Bantli ........................ 340/933 |
| 5,729,201 A | | 3/1998 | Jahnes et al. ................ 340/572 |
| 5,745,036 A | | 4/1998 | Clare ........................ 340/572 |
| 5,757,521 A | | 5/1998 | Walters et al. |
| 5,831,532 A | | 11/1998 | Gambino et al. ........... 340/572 |
| 5,844,523 A | * | 12/1998 | Brennan et al. ..... 343/700 MS |
| 5,913,543 A | | 6/1999 | Curiel ......................... 283/94 |
| 5,939,984 A | | 8/1999 | Brady et al. ............. 340/572.1 |
| 5,981,040 A | | 11/1999 | Rich et al. |
| 6,025,784 A | | 2/2000 | Mish ........................ 340/693.5 |
| 6,087,940 A | * | 7/2000 | Caperna et al. ........... 340/572.5 |
| 6,107,920 A | * | 8/2000 | Eberhardt et al. ........ 340/572.7 |
| 6,121,880 A | | 9/2000 | Scott et al. ............... 340/572.5 |
| 6,130,613 A | * | 10/2000 | Eberhardt et al. ........ 340/572.7 |
| 6,147,605 A | * | 11/2000 | Vega et al. ............... 340/572.7 |
| 6,154,137 A | | 11/2000 | Goff et al. ................ 340/572.4 |
| 6,156,442 A | | 12/2000 | Phillips |
| 6,164,548 A | | 12/2000 | Curiel |
| 6,252,508 B1 | * | 6/2001 | Vega et al. ............... 340/572.1 |
| 6,317,149 B1 | * | 11/2001 | Mochida et al. ............. 347/173 |
| 6,384,727 B1 | * | 5/2002 | Diprizio et al. ........... 340/572.7 |
| 6,582,887 B2 | * | 6/2003 | Luch .......................... 430/311 |
| 2002/0036237 A1 | * | 3/2002 | Atherton et al. ............. 235/492 |

* cited by examiner

ARTICLE WITH RETROREFLECTIVE AND RADIO FREQUENCY-RESPONSIVE FEATURES

BACKGROUND

The present disclosure relates to articles having both retroreflective features and radio frequency-responsive features. More specifically, the present disclosure relates to a security tag, adapted for use as a window sticker, incorporating retroreflective features and radio frequency-responsive features suitable for use for fraud resistance and information retrieval.

Vehicle license plates are one typical article commonly used to identify vehicles and the corresponding owners of the vehicles. Vehicle license plates convey a limited amount of visual information that typically includes a license number and a state, province, or country of registration, as well as whether the owner has a current license plate. License plates typically are formed of a retroreflective sheet and have security features. Radio frequency identification technology, sometimes referred to as RFID technology, has a variety of commercial applications, and is typically used for object identification and tracking from a limited distance. A radio frequency-responsive element can include electronic information identifying the object.

There exists a need to provide additional security and information currently provided by either license plates or RFID technology. A tag incorporating both retroreflective features and RFID technology is described in U.S. patent application Ser. No. 09/974,385, which is here incorporated by reference. The retroreflective features convey visual information and the RFID technology conveys electronic information. Difficulties exist when coupling a metallized retroreflective article with a radio frequency-responsive element. Many conventional retroreflective articles, such as license plate sheeting, have a tendency to detune, or adversely affect the performance of, a radio frequency-responsive element when placed within about a quarter inch, or 6 mm, of a metallized retroreflective article.

SUMMARY

The present disclosure includes a system that provides visual and electronic information in a readily identifiable combination tag where the radio frequency-responsive element is in close proximity to the retroreflective element. The combination tag includes a retroreflective article with an optical article and a reflective layer. The optical article has an optical surface and an opposite rear surface. A structured surface is coextensive with either the optical surface or the rear surface. In one example the optical article can include as optical elements glass microspheres (optical beads) or cube corner reflectors. The reflective layer is deposited on at least a portion of the rear surface, which is also the structured surface in the example, of the optical article. The reflective layer can include a non-contiguous metal layer. The combination tag also includes a radio frequency-responsive element. The radio frequency-responsive element includes an antenna and an integrated circuit. The radio frequency-responsive element has information storage and transmission capabilities adapted to enable an interrogation system to obtain information from the radio frequency-responsive element. The radio frequency-responsive element is coupled to one of the optical surface or the rear surface of the optical article. The combination tag is operable even if the radio frequency-responsive element is within 6 mm of the retroreflective article.

The system has several advantages. Among these advantages, the entire face of the combination tag can be retroreflective and the tag is still thin. Thus, the visual information is easily identifiable. The visual information and electronic information can be used together to verify vehicle registration. Visual information can be compared with the electronic information to confirm that the tag is legitimate. Further, the electronic information can be updated when registration, taxes or insurance payments are made providing an immediate method of verification. Other advantages are contemplated.

DETAILED DESCRIPTION

Figure 1:
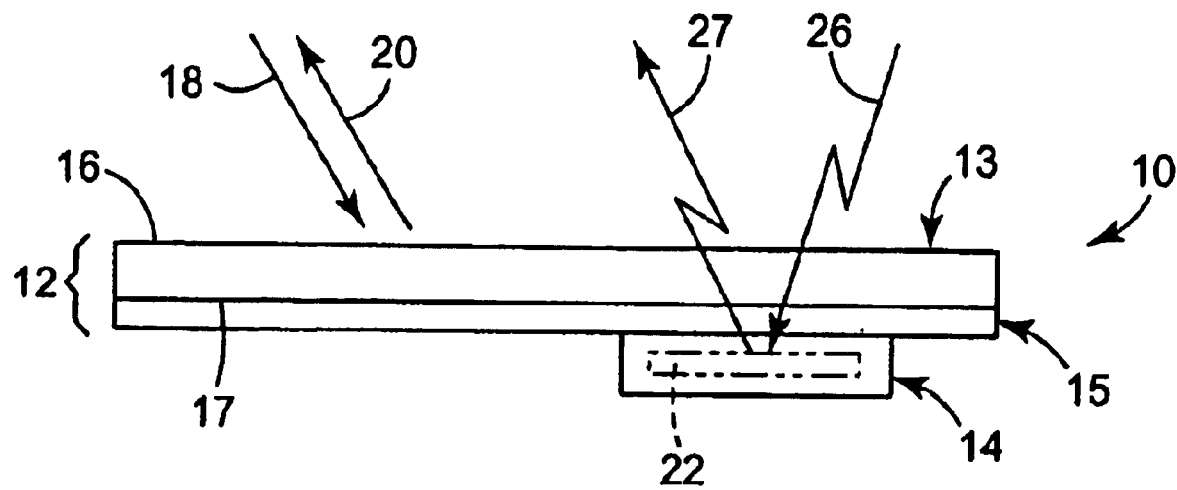
FIG. 1 shows a block diagram of a combination tag.

The combination tag of the present disclosure incorporates both a retroreflective article and an element responsive to a radio frequency signal to form a secure vehicle identification system. FIG. 1 shows a block diagram of such a combination tag 10. Tag 10 includes a retroreflective article 12 operably coupled to a radio frequency responsive element 14. The retroreflective article 12 includes an optical surface 16 where light incident on the optical surface 16 at various angles, indicated by ray 18, is reflected generally anti-parallel, indicated by ray 20, and back towards the light source (not shown). The retroreflective article 12 includes optical article 13 and reflective layer 15. Optical article 13 includes optical surface 16 and an opposite rear surface 17. One of the optical surface 16 or the rear surface 17 is a structured surface. The reflective layer 15 is deposited on at least a portion of the structured surface, in the example the rear surface. The radio frequency-responsive element 14 has information storage and transmission capability and includes an integrated circuit 22, shown in phantom, and an antenna 24. Element 14 is adapted to enable an interrogation system to obtain information from the element, indicated by electromagnetic waves 26, 27 and discussed in more detail below. The radio frequency-responsive element 14 is coupled, i.e., attached either directly or indirectly, to the rear surface 17 of the optical article.

Figure 2:
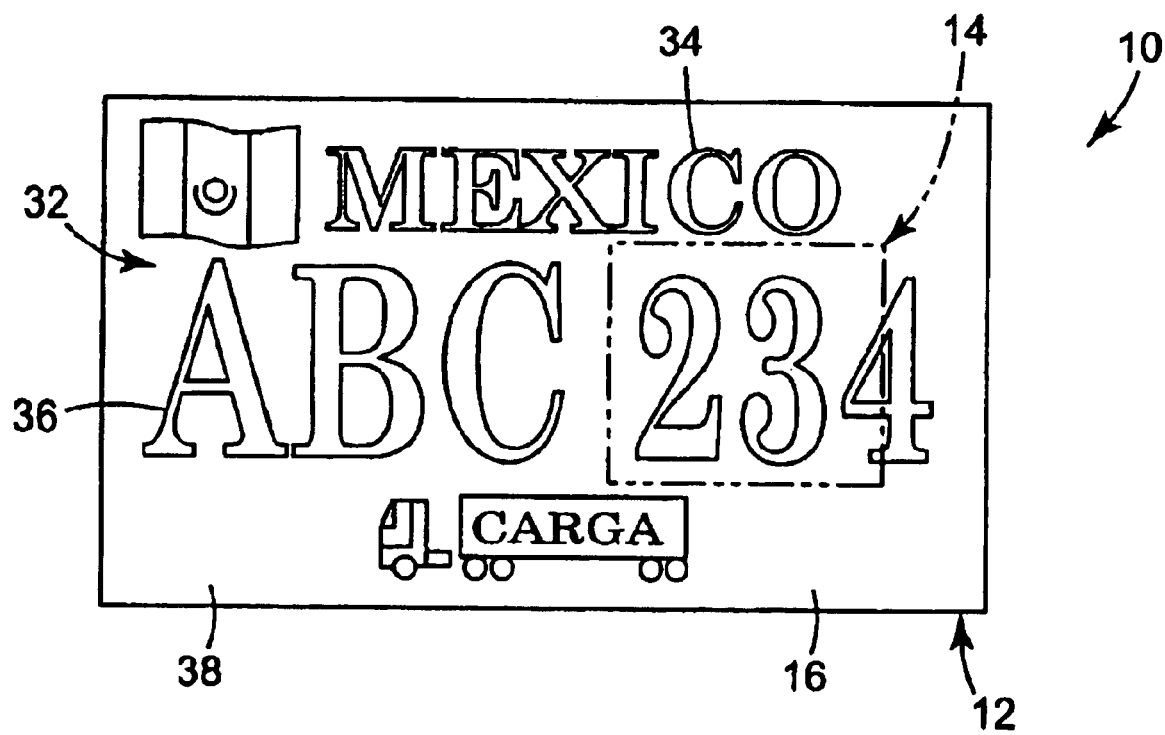
FIG. 2 shows a plan view of the tag of FIG. 1.

FIG. 2 shows a plan view of one example of the tag 10. Tag 10 includes a retroreflective article 12, and a radio frequency-responsive article 14, shown in phantom as attached to the rear of the retroreflective article 12. The retroreflective article 12 includes printed indicia 32 such as common background indicia 34 and tag-specific indicia 36 in the form of a Mexican license plate in the illustrated example. A pressure sensitive adhesive 38 covers the tag 10. In this example, the retroreflective article 12 and radio frequency-responsive element 14 can be used to verify vehicle registration. The radio frequency-responsive element 14 can be electronically read and the information compared to the license plate and vehicle identification number to assure that it is legitimate. In the example shown, the radio frequency-responsive element 14 can be updated when registration, taxes or insurance payments are made providing an immediate method of verification for law enforcement officials.

Radio frequency-responsive elements can be either active or passive. An active tag incorporates an additional energy source, such as a battery, into the tag construction. This energy source permits active radio frequency-responsive elements to create and transmit strong response signals even in regions where the interrogating radio frequency field is weak, and thus an active radio frequency-responsive element can be detected at greater range. However, the relatively short lifetime of the battery limits the useful life of the tag. In addition, the battery adds to the size and cost of the tag. A passive element derives the energy needed to power the element from the interrogating radio frequency field, and uses that energy to transmit response codes by modulating the impedance the antenna presents to the interrogating field, thereby modulating the signal reflected back to the reader antenna. Thus, their range is more limited. Because passive elements are preferred for many applications, the remainder of the discussion will be confined to this class of element. Those skilled in the art, however, will recognize that these two types of elements share many features and that both can be used in the examples of this disclosure.

Figure 3:
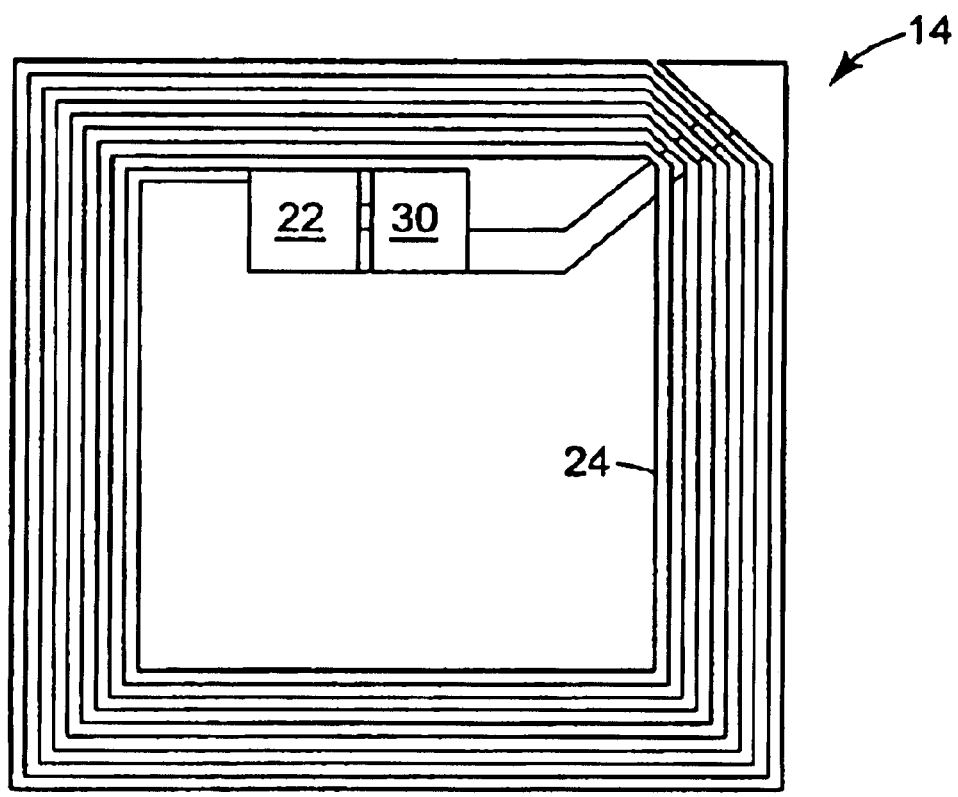
FIG. 3 shows a plan schematic view of a radio frequency-responsive element used in the tag of FIG. 1.

As shown in FIG. 3, a passive radio frequency-responsive element 14 typically includes two components: an integrated circuit 22 and an antenna 24. The integrated circuit provides the primary identification function. It includes firmware and circuitry to permanently store the tag identification and other desirable information, interpret and process commands received from the interrogation hardware, respond to requests for information by the interrogator, and assist the hardware in resolving conflicts resulting from multiple tags responding to interrogation simultaneously. Optionally, the integrated circuit may provide for updating the information stored in its memory (read/write) as opposed to just reading the information out (read only). Integrated circuits suitable for use in radio frequency-responsive elements include those available from Texas Instruments (in their TIRIS line of products), Philips (in their Mifare and Hitag line of products), Motorola/Indala, and Single Chip Systems, among others. One example is a tag from Texas Instruments sold under the trade designation #RI-I01-110A.

The antenna geometry and properties depend on the desired operating frequency of the radio frequency-responsive portion of the tag. For example, 2.45 GHz (or similar) radio frequency-responsive elements would typically include a dipole antenna, such as the linear dipole antennas (not shown), or folded dipole antennas (not shown). A 13.56 MHz (or similar) radio frequency-responsive element would use a spiral or coil antenna 24. In either ease, the antenna 24 intercepts the radio frequency energy radiated by an interrogation source. This signal energy carries both power and commands to the tag. The antenna enables the radio frequency-responsive element to absorb energy sufficient to power the integrated circuit (IC) chip and thereby provide the response to be detected. Thus, the characteristics of the antenna must be matched to the system in which it is incorporated. In the case of tags operating in the high MHz to GHz range, an important characteristic is the antenna length. Typically, the effective length of a dipole antenna is selected so that it is close to a half wavelength or multiple half wavelength of the interrogation signal. In the case of tags operating in the low to mid MHz region (13.56 MHz, for example) where a half wavelength antenna is impractical due to size limitations, the important characteristics are antenna inductance and the number of turns on the antenna coil. For both antenna types, good electrical conductivity is required. Typically, metals such as copper or aluminum would be used, but other conductors, including magnetic metals such as permalloy, are also acceptable. It is also important that the input impedance of the selected IC chip match the impedance of the antenna for maximum energy transfer.

A capacitor 30 is often included to increase the performance of the marker. The capacitor 30, when present, tunes the operating frequency of the tag to a particular value. This is desirable for obtaining maximum operating range and insuring compliance with regulatory requirements. The capacitor may either be a discrete component, or integrated into the antenna as described below. In some tag designs, particularly tags designed to operate at very high frequencies, such as 2.45 GHz, a tuning capacitor is not required. The capacitor is selected so that, when coupled to the inductance provided by the antenna, the resonant frequency of the composite structure, given by:

$$f_r = \left(\frac{1}{2\pi}\right)\sqrt{\frac{1}{LC}}$$

where
   C=capacitance (in Farads)
   L=inductance (in Henries)
closely matches the desired operating frequency of the RFID system. The capacitor may also be a distributed capacitor as described in U.S. Pat. Nos. 4,598,276 (Tait et al.) and 4,578,654 (Tait et al.), which are assigned to 3M. Distributed capacitance is desirable to reduce tag size, particularly thickness, and to minimize manual assembly.

Figure 4:
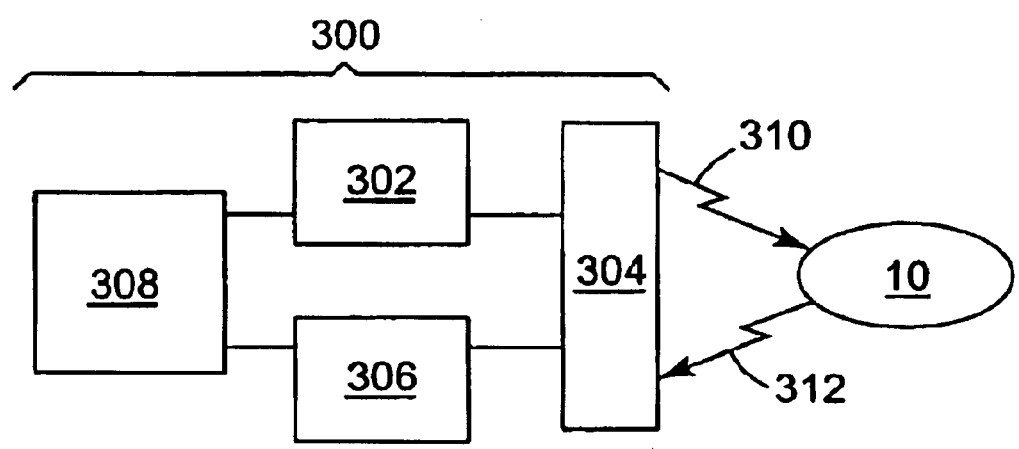
FIG. 4 is a block diagram of an RFID interrogation system interacting with the radio frequency-responsive element of FIG. 3.

In operation, as shown in FIG. 4, the radio frequency-responsive tag 10 is interrogated by an electronic article security system 300, which is typically located near the point at which the tags are to be monitored. Hand held detection devices may be used. An interrogation source 302 (typically including a drive oscillator and an amplifier) is coupled to an antenna 304 (sometimes described as a field coil) for transmitting an alternating radio frequency field, or interrogation signal, in the interrogation zone. The system 300 also includes an antenna for receiving a signal (shown as antenna 304, and sometimes described as a receiving coil) and detector 306 for processing signals produced by tags in the interrogation zone.

The interrogation source 302 transmits an interrogation signal 310, which may be selected within certain known frequency bands that are preferred because they do not interfere with other applications, and because they comply with applicable government regulations. When the radio frequency-responsive element receives an interrogation signal it transmits its own response code signal 312 that is received by the antenna 304 and transmitted to detector 306. The detector decodes the response, identifies the tag (typically based on information stored in a computer or other memory device 308), and takes action based on the code signal detected. Various modifications of the illustrated system are known to those of skill in the art including, for example, using separate antennas for the interrogation source 302 and the detector 306 in place of the single antenna 304 that is illustrated.

Figure 5:
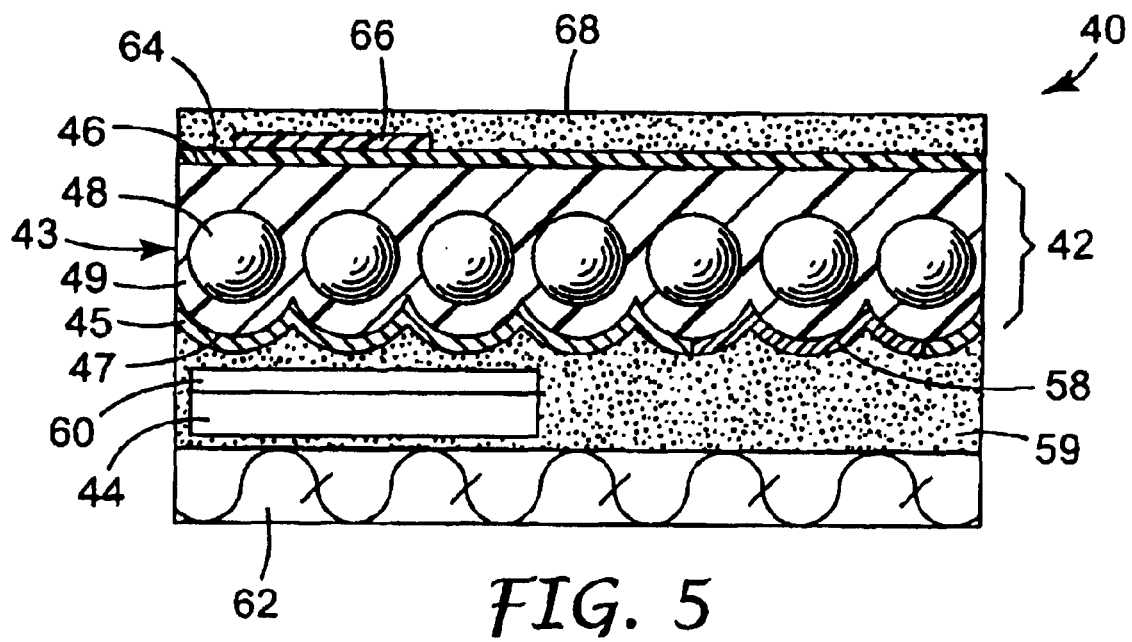
FIG. 5 is a section side schematic view of an example of the tag of FIG. 1.

FIG. 5 shows a section schematic side view of an example of tag 40 with a retroreflective article 42 and a radio frequency-responsive element 44 coupled to the rear of retroreflective article 42. Tag 40 is one example of the tag 10 of FIG. 1. The radio frequency-responsive element 44 can be that described above with respect to FIG. 3. The retroreflective article 42 includes an optical article 43 and a reflective layer 45.

Optical article 43 includes an optical surface 46 and an opposite structured rear surface 47. Optical article 43 shown in the example is one of several forms of microsphered type retroreflectors suitable for use in tag 40. In the example, optical article 43 includes an enclosed monolayer of optical elements 48, such as spheres which can be formed from glass, that are coated in a spacing resin 49, comprising, for example, polyvinyl butyral or polyester. Preferably, the spheres 48 and resin 49 are substantially transparent. Optical surface 46 is formed to be generally smooth and structured rear surface 47 is structured to generally conform to the spheres 48, as is known in the art. The optical surface 46 and rear surface 47 are formed on the spacing resin 49 such that spheres 48 are enclosed within the resin. An example of such an article is retroreflective sheet from Minnesota Mining and Manufacturing Company of St. Paul, Minn. designated as 3750 but without the reflective layer.

Variations on the microsphered type retroreflective article are contemplated. For example, the optical spheres can be partially embedded within a spacing resin and coated with a bead bond layer such that the spacing resin is between the reflector layer and the bead bond layer. The bead bond layer can contain a colored pigment that gives the retroreflective article a colored appearance in ambient light and a different appearance, such as silver, in a retroreflected light. Another variation of the retroreflective article includes an exposed monolayer of microspheres.

Figure 6:
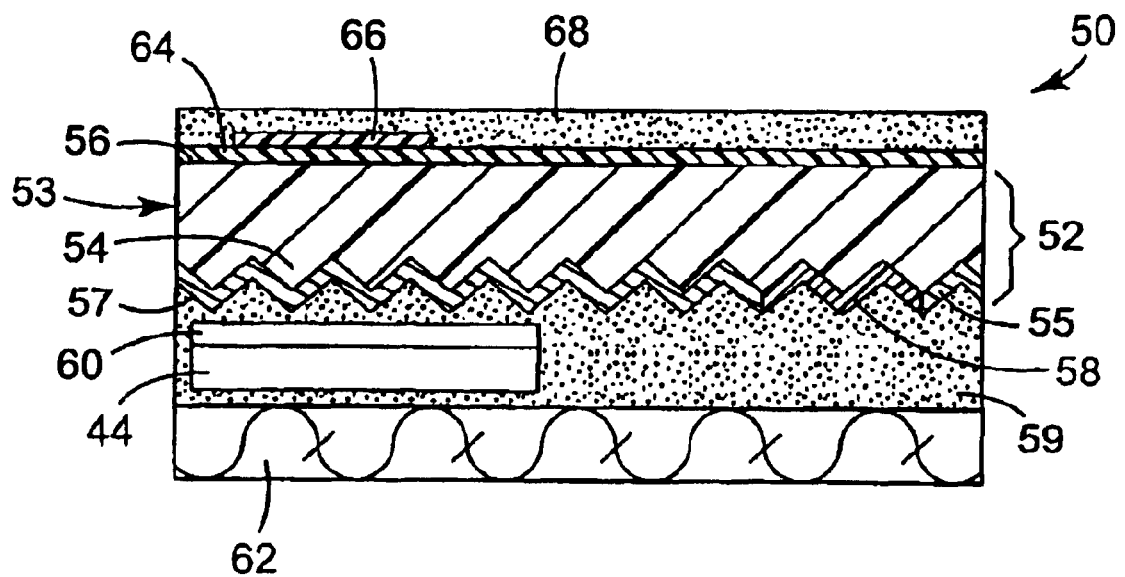
FIG. 6 is a section side schematic view of another example of the tag of FIG. 1.

Variations on the optical article 43 are also contemplated. FIG. 6 shows an example of a tag 50 having a construction similar to that of FIG. 5, but with cube corner retroreflectors 52 including cube corner-optical article 53 and reflective layer 45. Cube corner-optical article includes optical elements 54 in the form of cube corner elements. The cube corner retroreflector 52 can be formed from a suitable thermal plastic material such as vinyl, polycarbonate, arcylate or other material, or can be formed by curing a material such as urethane, epoxy, polyester, and acrylate oligomers or monomers. Cube corner elements 54 typically have three mutually perpendicular faces that cooperate to retroreflect light toward the light source. In the example shown, optical article 52 is a monolithic member including the cube corner elements 54. Alternatively, the cube corner element can be attached to a backing to form the retroreflector. In this case, the cube corner elements may be formed of a material other than the material used to form the backing. The article 52 can include an overlay (not shown) attached to the optical surface 56. The article 52 also includes structured rear surface 57.

Variations on the cube-corner retroreflector type optical article 52 are contemplated. For example, FIG. 6 shows optical elements as cube corner prisms, known in the art where the rear surface is the structured surface. The optical article can also be a sheet of cube corner cavities that is, the inverse of cube corner prisms, as is known in the art. If cube corner prisms are used, the optical surface becomes coextensive with the structured surface and the reflective layer is deposited on the optical surface of the cube corner prism elements which is then opposite the rear surface.

Returning to FIG. 5, where like elements with FIG. 6 are given the same reference number, a specularly reflective layer 45 is deposited on the structured rear surface 47. The reflective layer 45 is deposited directly over at least a portion of the optical article 43. For example, one portion of the optical article can include a security mark 58, discussed below, deposited directly on the structured surface. In FIG. 5, light enters the retroreflective article 42 through the optical surface 46 of the spacing resin 49 and is focused by the microspheres 48. Light is then reflected by the reflective layer 45 back through the microspheres 48 and spacing resin 49 toward the light source. In FIG. 6, light entering the cube corner optical article 52 through the optical surface 56 is specularly reflected off of the three mutually perpendicular faces of the cube corner elements 54 and returned toward the light source.

Reflective layer 45 can be simply a diffusely reflecting pigment such as a white ink or coating for applications where only a little retroreflection is desired. With simply a diffusely reflecting reflective layer, relatively small amounts of incident light will be directed back toward the light source. The diffusely reflecting reflective layer need not include metal.

The reflective layer 45 can contain a metallized ink to increase retroreflectivity of the article. The metallized inks include non-contiguous metal particles deposited on the structured surface so as not to form a continuous metal layer over a substantial portion of the structured surface. One example of a non-contiguous metal layer are randomly scattered metal particles that are not all electrically connected together. A non-contiguous metal layer can provide specular reflection and not detune the radio frequency-responsive element.

The metallized ink generally comprises a polymer carrier, like a paint binder, with a certain percentage of metal particles, which functions as a reflector coat. Experimentation has shown that a greater percentage of metal in the ink decreases the read distance of the radio frequency-responsive element. That is, as the percentage of metal in the ink increases the efficiency of the radio frequency-responsive element decreases. For example, a 10% concentration of metal in the ink indicates approximately a 10% loss in read distance compared to an ink without metal. But the percentage of metal is directly related to the amount of retroreflection. Further, the percentage of metal is directly related to the graininess of the appearance of the tag when not under retroreflection. Still further, the cost of the inks is often directly related to the amount of metal which in some examples is pure silver. Inks having a metal content of approximately 10% to 14% by volume provide one preferred combination of radio frequency-responsive element efficiency, retroreflection, desirable appearance, and economics.

Examples of metallized inks useable in the reflector layer include inks available from Akzo Nobel (locations throughout the world including Plymouth, Minn.). These inks are sold under the trade designations MUFP0877 Metalglow 877 Silver UV flexo ink, MGUP0877 Metallure 877 silver UV flexo ink, or WMJ02003 Metalglow 877 Silver water based flexo ink. The metals in these inks are silver, aluminum or other metals, and provide a specularly reflective surface in a non-contiguous metal layer. The inks can be mixed with other inks, such as an opaque white ink, to form diffuse colors with a desired appearance or "diffuse look" when viewed from the optical surface 46. The ink sold under the trade designation MGUP0877, described above, has approximately 12% silver by volume but produces a retroreflective value visually approximate that of vapor-coated retroreflective sheeting.

The inks can be applied in a variety of methods, such as the commonly available flexographic process where a plate with an image is pressed onto the optical article 43. The inks are either air dried or dried via ultraviolet curing, as is known in the art. These processes are not harsh and can be used to metalize cube corner articles as well as beaded retroreflectors.

This process permits a wide variety of security marks 58 to be added to the retroreflective article 42. The harsh process, for example intense heat, of vapor coating metallized layers onto retroreflective articles could destroy some security features. Security marks 58 in the form of patterned coatings such as pearlescent, iridescent, color switching, phosphorescent, UV visible, holograms, and others, can be placed on the beaded side of the sheeting using flexographic printing methods or via stickers before the reflective layer is applied so they will show through the sheeting from the optical surface. Such markings are usable for authenticity in identification with the unaided eye. Another system for security marking can be employed using variations in the retroflectance of the sheeting. Coatings with the same appearance when viewed from the optical surface can be made to have very different retroreflective values by using different reflector coatings. The difference in retroreflection can be viewed as patterned areas of brighter and less bright marks when viewed using retroreflective light. Additionally, generally transparent patterned colors can be applied to the reflector layer which will be visible in diffuse light and generally invisible in retroreflected light. More than one type of security marks can be employed for greater security.

The radio frequency-responsive element 44 in the illustrated examples is adhered to the rear structured surface 47 with adhesive 59. In the example shown, adhesive 59 is an acrylate adhesive applied to the reflective layer 45 and security mark 58. The radio frequency-responsive element 44 can include a coating 60, such as an opaque ink to further obscure the radio frequency-responsive element 44 when the tag is viewed from the optical surface. In the example, coating 60 is a white ink. A backing 62 is also adhered to the radio frequency-responsive element 44 and rear structured surface 47. The backing 62, as shown, is a polymer paper, such as polypropylene paper available from Ritrama, although other backings can be used.

The optical surface 46 includes background indicia 64, tag-specific indicia 66 and an adhesive 68. The background indicia 64 is generally common to tags of a particular type. For example, the style of a Mexican license plate could be printed for each tag in Mexico. Background indicia 64 can be applied to the tag using various processes, such as the flexographic process known in the art. The tag-specific indicia 66 can include such information as the specific license plate number, or the like. Tag-specific indicia 66 can be applied using various processes such as thermal transfer on top of the background indicia 64. An adhesive 68, such as an acrylate adhesive, covers the tag and is used to affix the tag onto the inside of a window of the vehicle. Alternatively, if the tag is to be attached to the outside of the vehicle, the backing 62 could be removed or an adhesive can be applied to the backing 62 instead of adhesive 68.

Various modifications and combinations of the embodiments disclosed will be apparent to those skilled in the art, and those modifications are intended to be within the scope of the invention as defined in the appended claims.

What is claimed is:

1. A combination tag, comprising:
   a retroreflective article having an optical article and a reflective layer;
   wherein the optical article includes an optical surface, an opposite rear surface, and a structured surface coextensive with one of the optical surface and the rear surface;
   wherein the reflective layer comprises a metallized ink deposited on at least a portion of the structured surface of the optical article;
   a radio frequency-responsive element including an antenna and an integrated circuit, the radio frequency-responsive element having information storage and transmission capabilities adapted to enable an interrogation system to obtain information from the radio frequency-responsive element; and
   wherein the radio frequency-responsive element is coupled to one of the optical surface or rear surface of the retroreflective article.

2. The combination tag of claim 1 wherein the metallized ink includes a polymer carrier and non-contiguous metal particles.

3. The combination tag of claim 2 wherein the metallized ink has a metal content of about 10% to 14% by volume.

4. The combination tag of claim 2 wherein the metal is silver.

5. The combination tag of claim 1 wherein the optical article includes glass microspheres embedded in a spacing resin, and wherein the optical surface and rear surface are formed from the spacing resin.

6. A The combination tag of claim 5 wherein the reflective layer is deposited directly on at least portions of the spacing resin.

7. The combination tag of claim 1, and further comprising security indicia disposed on the optical article.

8. A combination tag, comprising:
   a retroreflective article having an optical article and a reflective layer;
   wherein the optical article includes optical elements comprising microspheres embedded in a spacing resin, the optical article having an optical surface and an opposite structured rear surface formed from the spacing resin; and
   wherein the reflective layer is a non contiguous metallized layer deposited on at least a portion of the structured rear surface of the optical article; and
   a radio frequency-responsive element coupled to the rear surface of the article, the radio frequency-responsive element including an antenna and an integrated circuit, the radio frequency-responsive element having information storage end transmission capabilities adapted to enable an interrogation system to obtain information from the radio frequency-responsive element.

9. The combination tag of claim 8 wherein the reflective layer includes a metallized ink deposited on at least a portion of the structured rear surface of the optical article.

10. The combination tag of claim 9 wherein the metallized ink includes a polymer earner and non-contiguous metal particles.

11. The combination tag of claim 10 wherein the metallized ink has a metal content of about 10% to 14% by volume.

* * * * *

UNITED STATES PATENT AND TRADEMARK OFFICE
CERTIFICATE OF CORRECTION

PATENT NO. : 6,758,405 B2
DATED : July 6, 2004
INVENTOR(S) : Look, Thomas F.

It is certified that error appears in the above-identified patent and that said Letters Patent is hereby corrected as shown below:

<u>Column 8,</u>
Line 30, delete "A" before "The".
Line 51, delete "end" and insert -- and --.
Line 58, delete "earner" and insert -- carrier --.

Signed and Sealed this

Sixteenth Day of November, 2004

JON W. DUDAS
*Director of the United States Patent and Trademark Office*